(12) United States Patent
Yoshida

(10) Patent No.: US 10,142,516 B2
(45) Date of Patent: Nov. 27, 2018

(54) IMAGE READING DEVICE AND IMAGE FORMING APPARATUS

(71) Applicant: KYOCERA Document Solutions Inc., Osaka (JP)

(72) Inventor: Masaya Yoshida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/686,891

(22) Filed: Aug. 25, 2017

(65) Prior Publication Data

US 2018/0063375 A1    Mar. 1, 2018

(30) Foreign Application Priority Data

Aug. 29, 2016   (JP) ................... 2016-166902

(51) Int. Cl.
*H04N 1/44* (2006.01)
*H04N 1/00* (2006.01)

(52) U.S. Cl.
CPC ....... *H04N 1/4426* (2013.01); *H04N 1/00588* (2013.01); *H04N 1/00599* (2013.01); *H04N 1/00801* (2013.01); *H04N 2201/0081* (2013.01); *H04N 2201/0094* (2013.01)

(58) Field of Classification Search
CPC .................................................. H04N 1/4426
USPC ....................................................... 358/1.12
See application file for complete search history.

(56) References Cited

U.S. PATENT DOCUMENTS

| | | | | |
|---|---|---|---|---|
| 2011/0007370 A1* | 1/2011 | Kitazawa | ................. | B65H 5/26 |
| | | | | 358/498 |
| 2011/0052289 A1* | 3/2011 | Ogasawara | .............. | B65H 5/26 |
| | | | | 399/367 |
| 2011/0075179 A1* | 3/2011 | Utsumi | ................... | G06F 21/31 |
| | | | | 358/1.13 |
| 2017/0286765 A1* | 10/2017 | Rodriguez | ......... | G06K 9/00469 |
| 2017/0374232 A1* | 12/2017 | Yoshida | ............. | H04N 1/00344 |

FOREIGN PATENT DOCUMENTS

JP    H08-044261 A    2/1996

* cited by examiner

*Primary Examiner* — Jacky X Zheng
(74) *Attorney, Agent, or Firm* — Studebaker & Brackett PC

(57) ABSTRACT

An image reading device includes a loading section, a reader, and a document feeder. The loading section receives loading of a document and an identification medium. The reader reads the document and the identification medium. The document feeder conveys the document to the reader. The loading section includes a second contact glass and a medium restriction section. The second contact glass receives loading of the identification medium. The medium restriction section restricts a position of the identification medium loaded on the second contact glass. The document being conveyed by the document feeder has opposite end portions and a central portion therebetween. The opposite end portions respectively include opposite ends of the document in a direction perpendicular to a conveyance direction of the document. Only the central portion, among the opposite end portions and the central portion, of the document comes in contact with the medium restriction section.

12 Claims, 8 Drawing Sheets

IMAGE READING DEVICE AND IMAGE FORMING APPARATUS

INCORPORATION BY REFERENCE

The present application claims priority under 35 U.S.C. § 119 to Japanese Patent Application No. 2016-166902, filed on Aug. 29, 2016. The contents of this application are incorporated herein by reference in their entirety.

BACKGROUND

The present disclosure relates to image reading devices and image forming apparatuses.

In one example, a copier includes a scanner, a comparison section, and memory. The scanner reads a document or a department ID card of a user. The comparison section changes the state of the copier to a copy unrestricted state if bit information of the department ID card read by the scanner matches bit information in the memory.

In another example, a copier requires a user to place an identification medium (department ID card) in the copier and start a reading operation by the copier in order to use a copy function. As a consequence, the copier shifts into a copy unrestricted state if bit information of the identification medium read by the copier matches bit information in memory. Next, the user removes the identification medium from the copier, loads a document in the copier, and starts making a copy.

SUMMARY

An image reading device according to an aspect of the present disclosure includes a loading section, a reader, and a document feeder. The loading section receives loading of a document and an identification medium. The reader reads the document and the identification medium. The document feeder conveys the document to the reader. The loading section includes a first loading section and a medium restriction section. The first loading section receives loading of the identification medium. The medium restriction section restricts a position of the identification medium loaded on the first loading section. The document being conveyed by the document feeder has opposite end portions and a central portion between the opposite end portions. The opposite end portions respectively include opposite ends of the document in a direction perpendicular to a conveyance direction of the document. Only the central portion, among the opposite end portions and the central portion, of the document comes in contact with the medium restriction section.

An image forming apparatus according to another aspect of the present disclosure includes the above-described image reading device and an image forming device. The image forming device forms an image on a recording medium.

DETAILED DESCRIPTION

Figure 1:
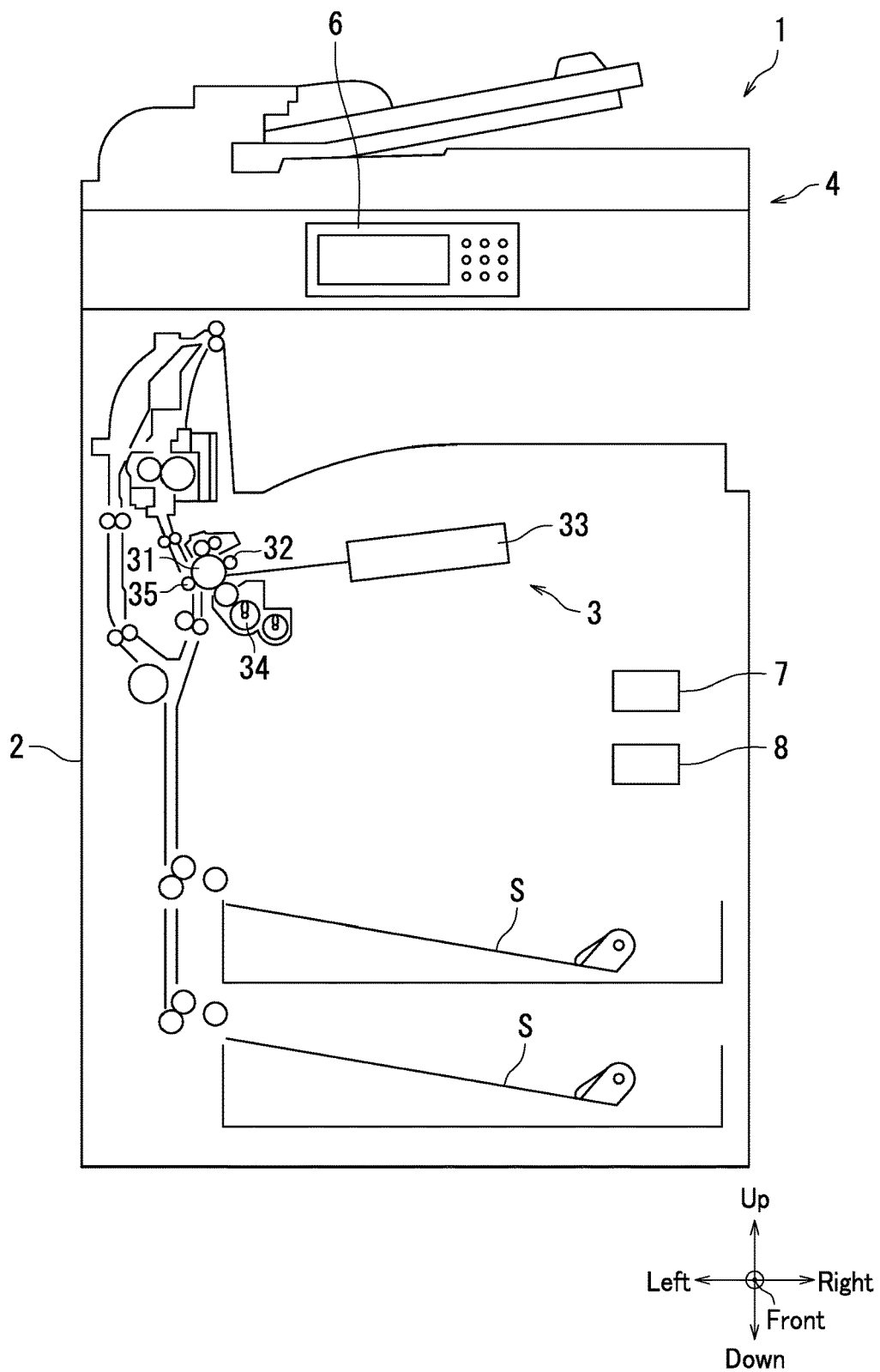
FIG. 1 is a diagram illustrating a configuration of an image forming apparatus according to an embodiment of the present disclosure.

The following describes embodiments of the present disclosure with reference to the drawings. However, the present disclosure is not limited to the following embodiments. Elements that are the same or equivalent are indicated by the same reference signs in the drawings and description thereof is not repeated.

The following describes an image forming apparatus 1 according to an embodiment of the present disclosure with reference to FIG. 1. FIG. 1 illustrates a configuration of the image forming apparatus 1 according to the embodiment of the present disclosure.

As illustrated in FIG. 1, the image forming apparatus 1 according to the present embodiment is a multifunction peripheral having a copy function. The multifunction peripheral for example has at least one of a printing function and a facsimile function in addition to the copy function.

The image forming apparatus 1 includes a housing 2, an image forming device 3, an image reading device 4, an operation panel 6, a controller 7, and a storage section 8. In FIG. 1, a front-rear direction is defined on the assumption that the operation panel 6 faces forward. A left-right direction is defined on the assumption that a left side of the image forming apparatus 1 is to the left of the front of the image forming apparatus 1 viewed from the front. An up-down direction is defined as a direction perpendicular to the front-rear direction and the left-right direction.

The housing 2 houses the image forming device 3, the controller 7, and the storage section 8. The housing 2 is in contact with a lower surface of the image reading device 4 and supports the image reading device 4 from below.

The image forming device 3 forms a toner image on a sheet S. The image forming device 3 includes a photosensitive drum 31, a charging section 32, a light exposure section 33, a development section 34, and a transfer section 35.

The sheet S is an example of what may be referred to as a recording medium according to the present disclosure. The sheet S is for example plain paper, copy paper, recycled paper, thin paper, thick paper, glossy paper, or an overhead projector (OHP) film.

Figure 2:
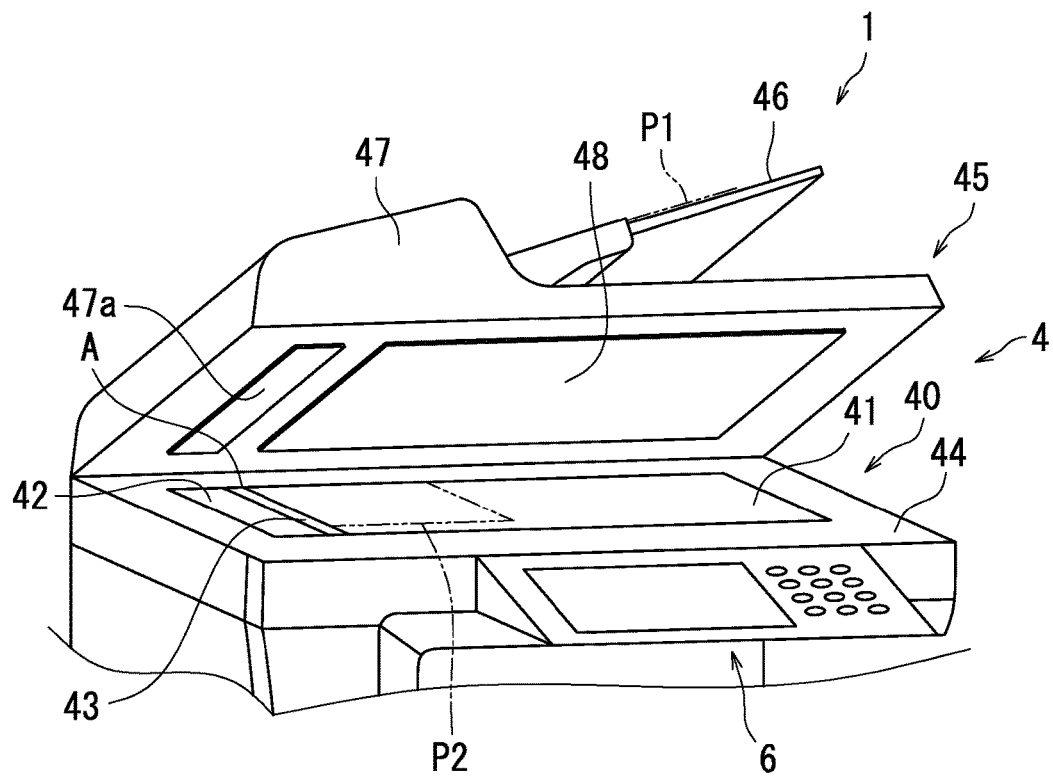
FIG. 2 is a perspective view illustrating an image reading device of the image forming apparatus illustrated in FIG. 1.

The following describes a configuration of the image reading device 4 with reference to FIG. 2. FIG. 2 is a perspective view illustrating the image reading device 4 of the image forming apparatus 1. The image reading device 4 reads an image of a document P1, a document P2, and an identification medium to generate image data. The image reading device 4 is for example a scanner. As illustrated in FIG. 2, the image reading device 4 includes a loading section 40 and a document feeder 45.

The identification medium is for example rectangular. A personal number such as an employee number and a student number, and personal data such as a facial picture are printed on the identification medium. The identification medium is for example an employee identification card, a student identification card, a driver's license, or a health insurance card.

The document P2 and the identification medium are loaded on the loading section 40. The loading section 40 includes first contact glass 41, second contact glass 42, a partition 43, and a frame 44.

The first contact glass 41 is an example of what may be referred to as a second loading section according to the present disclosure. The first contact glass 41 is a transparent glass plate. The first contact glass 41 is located at the center of the loading section 40. The first contact glass 41 is disposed in the loading section 40 such that a longitudinal direction of the first contact glass 41 matches the left-right direction.

The document P2 or the identification medium is to be loaded on the first contact glass 41. The document P2 is loaded on the first contact glass 41 such that a side thereof that is to be read is in contact with a top surface of the first contact glass 41.

The identification medium is loaded on the first contact glass 41 such that a side thereof having the personal data is in contact with the top surface of the first contact glass 41. Preferably, the document P2 and the identification medium are positioned in accordance with a reference point A marked at the rear left of the first contact glass 41.

The second contact glass 42 is an example of what may be referred to as the first loading section according to the present disclosure. The second contact glass 42 is a transparent glass plate. The second contact glass 42 is located leftward of the first contact glass 41. The second contact glass 42 is disposed in the loading section 40 such that a longitudinal direction of the second contact glass 42 matches the up-down direction.

The identification medium is to be loaded on the second contact glass 42. The identification medium is loaded on the second contact glass 42 such that a side thereof having the personal data is in contact with a top surface of the second contact glass 42.

The partition 43 is located between the first contact glass 41 and the second contact glass 42. The frame 44 surrounds the first contact glass 41, the second contact glass 42, and the partition 43. The first contact glass 41 and the second contact glass 42 may be integral, being continuous beneath the partition 43.

The document feeder 45 is openable and closable relative to the loading section 40. More specifically, the document feeder 45 is attached to the loading section 40 with a rotary shaft therebetween. The document feeder 45 is supported by the loading section 40 so as to be pivotable about the rotary shaft. The rotary shaft is located at a rear end of the loading section 40. Thus, the document feeder 45 is openable and closable in the up-down direction through pivoting at a rear end thereof. The document feeder 45 has a bottom surface that faces a top surface of the loading section 40 when the document feeder 45 is closed.

The document feeder 45 includes a document feed tray 46, a conveyance section 47, a contact section 48, and a document exit tray. The document feed tray 46 is an example of what may be referred to as a feed tray according to the present disclosure. The document feed tray 46 is located in an upper part of the document feeder 45. A plurality of sheets of the document P1 can be loaded on the document feed tray 46. The document P1 is loaded on the document feed tray 46 such that a side of each sheet that is to be read faces upward.

The document feed tray 46 has a document detection section. The document detection section detects whether or not the document P1 is on the document feed tray 46. Upon detecting the document P1, the document detection section outputs a document detection signal to the controller 7.

The conveyance section 47 includes a pair of conveyance rollers and a guide plate 47a. The pair of conveyance rollers conveys the document P1 from the document feed tray 46 to the top surface of the second contact glass 42. In a situation in which a plurality of sheets of the document P1 are loaded on the document feed tray 46, the pair of conveyance rollers successively conveys the sheets of the document P1 to the top surface of the second contact glass 42.

The guide plate 47a and a left portion of the frame 44 of the loading section 40 form a first guide section when the document feeder 45 is closed. The first guide section guides the document P1 being conveyed by the pair of conveyance rollers to the top surface of the second contact glass 42.

The guide plate 47a and the partition 43 form a second guide section when the document feeder 45 is closed. After the document P1 has been guided to the top surface of the second contact glass 42, the second guide section guides the document P1 toward the document exit tray.

The document exit tray is located under the document feed tray 46. A plurality of the document P1 can be stacked on the document exit tray.

The contact section 48 is plate-shaped. The contact section 48 is disposed on the bottom surface of the document feeder 45. A main surface of the contact section 48 faces downward when the document feeder 45 is closed. The contact section 48 evenly presses an entirety of the first contact glass 41 through the main surface thereof. As a result, the document P2 or the identification medium loaded on the first contact glass 41 is restricted from moving. The contact section 48 is white.

Figure 3:
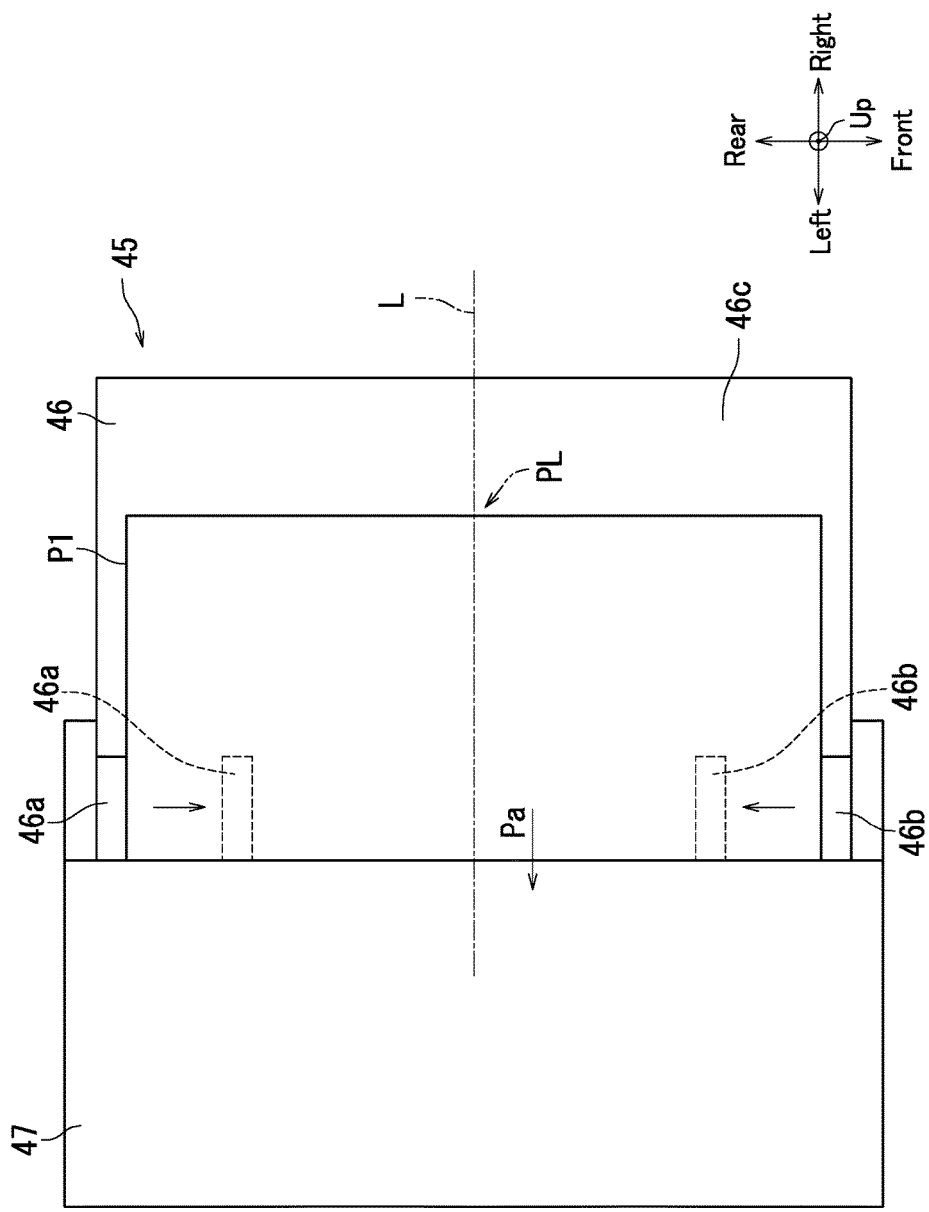
FIG. 3 is a plan view schematically illustrating a document feeder illustrated in FIG. 2.

The following describes the document feeder 45 with reference to FIG. 3. FIG. 3 is a plan view schematically illustrating the document feeder 45. More specifically, a dash-dot line L shown in FIG. 3 represents a centerline of the document feed tray 46.

As illustrated in FIG. 3, the document feed tray 46 has cursors 46a and 46b, and a top surface 46c. The cursors 46a and 46b are an example of what may be referred to as a document restriction section according to the present disclosure. The cursors 46a and 46b are fixable to any positions on the top surface 46c in the front-rear direction. That is, the cursors 46a and 46b are disposed on the top surface 46c so as to be slidable in the front-back direction. The cursor 46a comes in contact with a rear edge of the document P1. The cursor 46b comes in contact with a front edge of the document P1. Thus, the cursors 46a and 46b restricts the position of the document P1 loaded on the document feed tray 46 in the front-rear direction.

The cursors 46a and 46b restrict the position of the document P1 such that a centerline PL of the document P1 coincides with the centerline L of the document feed tray 46. The centerline L of the document feed tray 46 refers to a centerline of the document feed tray 46 in the front-rear direction. The centerline PL of the document P1 refers to a centerline of the document P1 in the front-rear direction. The centerline L of the document feed tray 46 and the centerline PL of the document P1 extend in parallel to a conveyance direction Pa of the document P1. More specifically, the cursors 46a and 46b are for example operatively coupled to each other through a coupling member such as a rack and pinion. Thus, the cursors 46a and 46b are moved in conjunction with each other in the front-rear direction according to the size of the document P1. As a result, the centerline PL of the document P1 coincides with the centerline L of the document feed tray 46.

Figure 4:
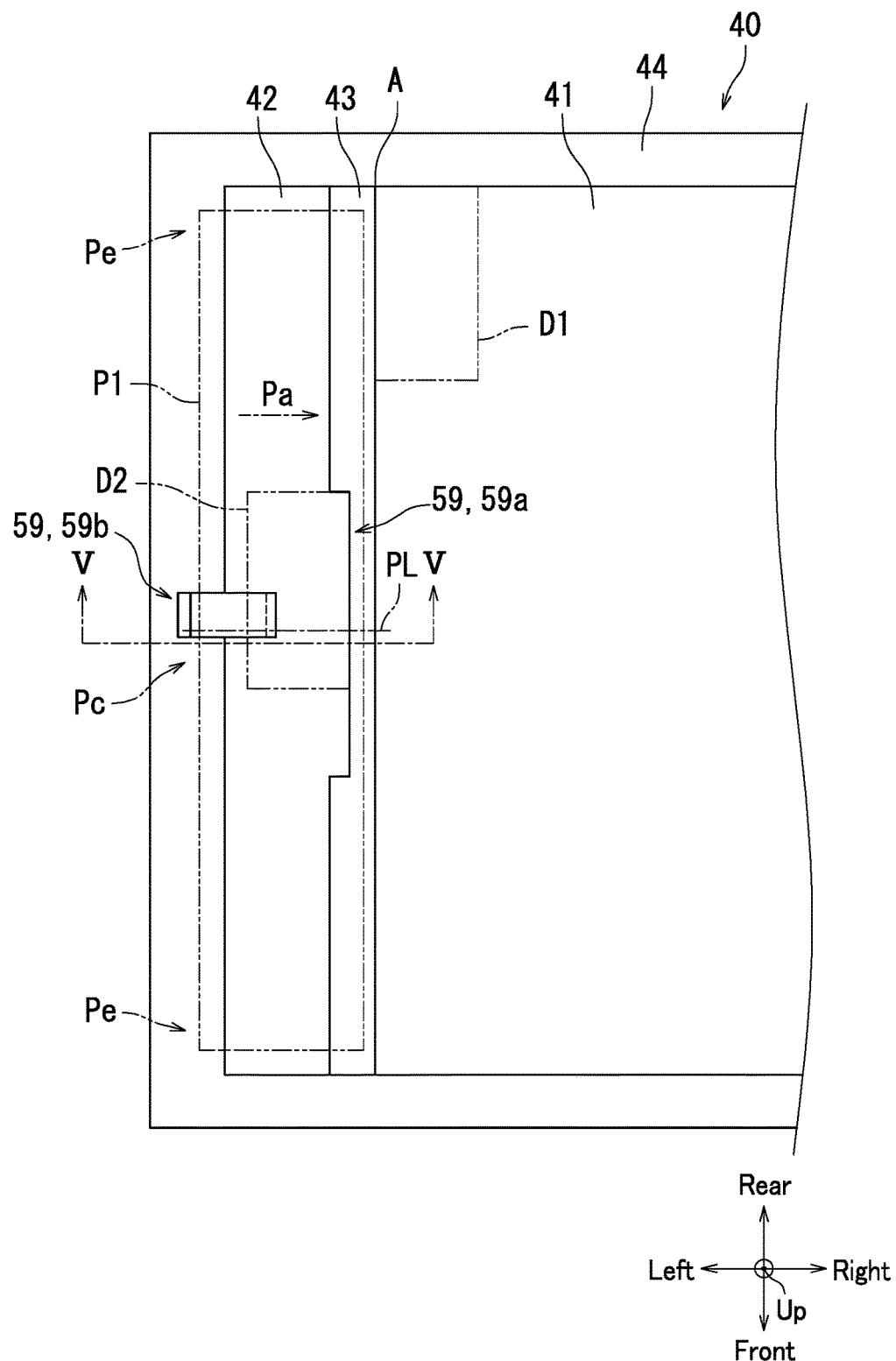
FIG. 4 is a plan view schematically illustrating a loading section illustrated in FIG. 3.

The following describes the loading section 40 with reference to FIG. 4. FIG. 4 is a plan view schematically illustrating the loading section 40. More specifically, FIG. 4 is a plan view illustrating a left portion of the loading section 40. A dashed and double dotted line P1 shown in FIG. 4 represents the document P1 being conveyed from the document feed tray 46 (see FIG. 3). The document P1 is conveyed from left to right in a direction of an arrow Pa shown in FIG. 4. The document P1 has opposite end portions Pe and a central portion Pc between the opposite end portions Pe. The opposite end portions Pe respectively include opposite ends of the document P1 in a direction perpendicular to the conveyance direction of the document P1.

A first loading position is defined on the first contact glass 41. A dashed and double dotted line D1 shown in FIG. 4 represents an identification medium D1, which is the identification medium loaded on the first contact glass 41 at the first loading position. Hereinafter, the identification medium in the first loading position is referred to as the identification medium D1. The first loading position is a position of the document P2 (see FIG. 2) or the identification medium D1 loaded in accordance with the reference point A on the first contact glass 41.

A second loading position is defined on the second contact glass 42. A dashed and double dotted line D2 shown in FIG. 4 represents an identification medium D2, which is the identification medium loaded on the second contact glass 42 at the second loading position. Hereinafter, the identification medium in the second loading position is referred to as the identification medium D2. The second loading position is a position of the identification medium D2 loaded on the second contact glass 42.

As illustrated in FIG. 4, the loading section 40 further has a medium restriction section 59. The medium restriction section 59 restricts the position of the identification medium D2 loaded on the second contact glass 42. The medium restriction section 59 restricts the identification medium D2 to the second loading position.

Only the central portion Pc, among the opposite end portions Pe and the central portion Pc, of the document P1 being conveyed comes in contact with the medium restriction section 59. The medium restriction section 59 is located in the loading section 40 at a position corresponding to the position of the document P1 restricted by the cursors 46a and 46b described with reference to FIG. 3. The medium restriction section 59 according to the present embodiment is located in a central portion of the loading section 40 in the front-back direction. For example, the centerline L of the document feed tray 46 and the centerline PL of the document P1 overlap the medium restriction section 59 in a plan view of the document feeder 45 conveying the document P1 from the document feed tray 46 toward the top surface of the second contact glass 42. Thus, the image forming apparatus 1 according to the present embodiment can prevent end portions of the document P1 being conveyed (the opposite end portions Pe of the document P1) from coming in contact with the medium restriction section 59, allowing smooth conveyance of the document P1.

The medium restriction section 59 includes a cutaway section 59a and a contact section 59b. The contact section 59b will be described later with reference to FIG. 5.

The cutaway section 59a is formed in the partition 43. The cutaway section 59a is for example formed by cutting away a portion of the partition 43 according to the shape of the identification medium D2. The cutaway section 59a according to the present embodiment is rectangular in a plan view.

The cutaway section 59a comes in contact with an edge of the identification medium D2 loaded on the second contact glass 42. More specifically, the identification medium D2 is loaded on the second contact glass 42 such that a corner of the identification medium D2 is in contact with a corner of the cutaway section 59a. As a result, the identification medium D2 in the second loading position is restricted from moving rightward and rearward.

The cutaway section 59a according to the present embodiment is located in a central portion of the partition 43 in the front-back direction. Thus, the image forming apparatus 1 according to the present embodiment can prevent the end portions of the document P1 being conveyed from coming in contact with the cutaway section 59a, allowing smooth conveyance of the document P1.

Figure 5:
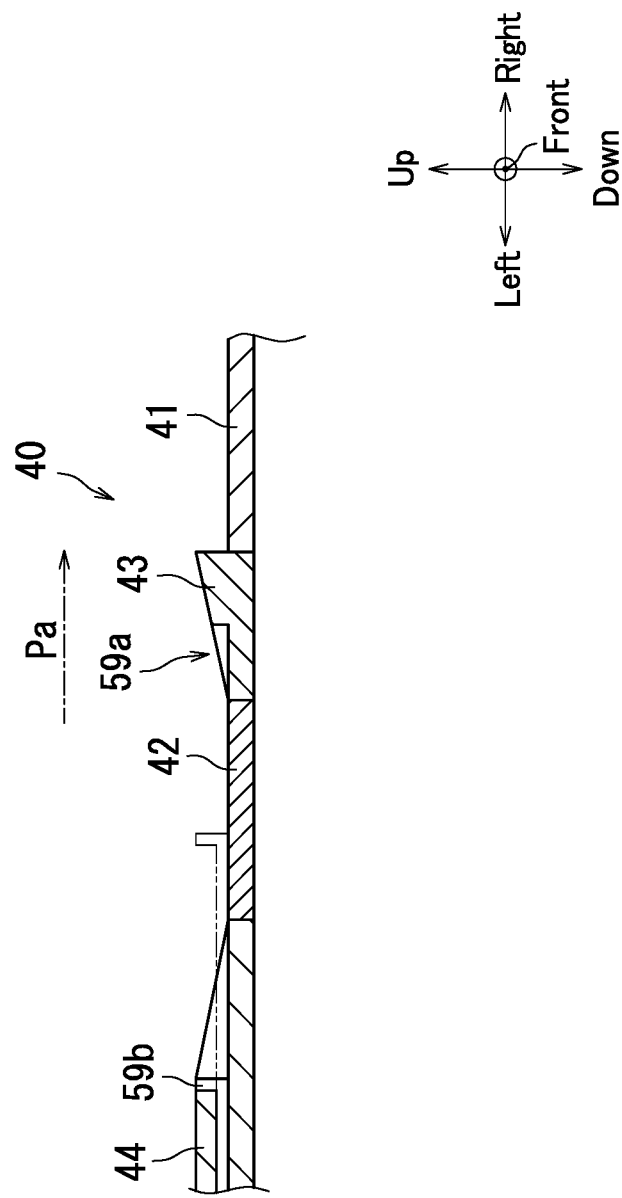
FIG. 5 is a cross-sectional view taken along line V-V in FIG. 4.

The following further describes the loading section 40 with reference to FIG. 5. FIG. 5 is a cross-sectional view taken along line V-V in FIG. 4. As illustrated in FIG. 5, the partition 43 has a face sloping at an angle to the conveyance direction Pa of the document P1 described with reference to FIG. 4. Thus, the partition 43 guides the document P1 from the top surface of the second contact glass 42 toward the document exit tray.

The contact section 59b is L-shaped in a front view. The contact section 59b is disposed on the left portion of the frame 44 of the loading section 40. The contact section 59b is for example operated by a user to move in the left-right direction on the top surface of the second contact glass 42. The contact section 59b comes in contact with the identification medium D2 to restrict the identification medium D2 from moving leftward.

Figure 6:
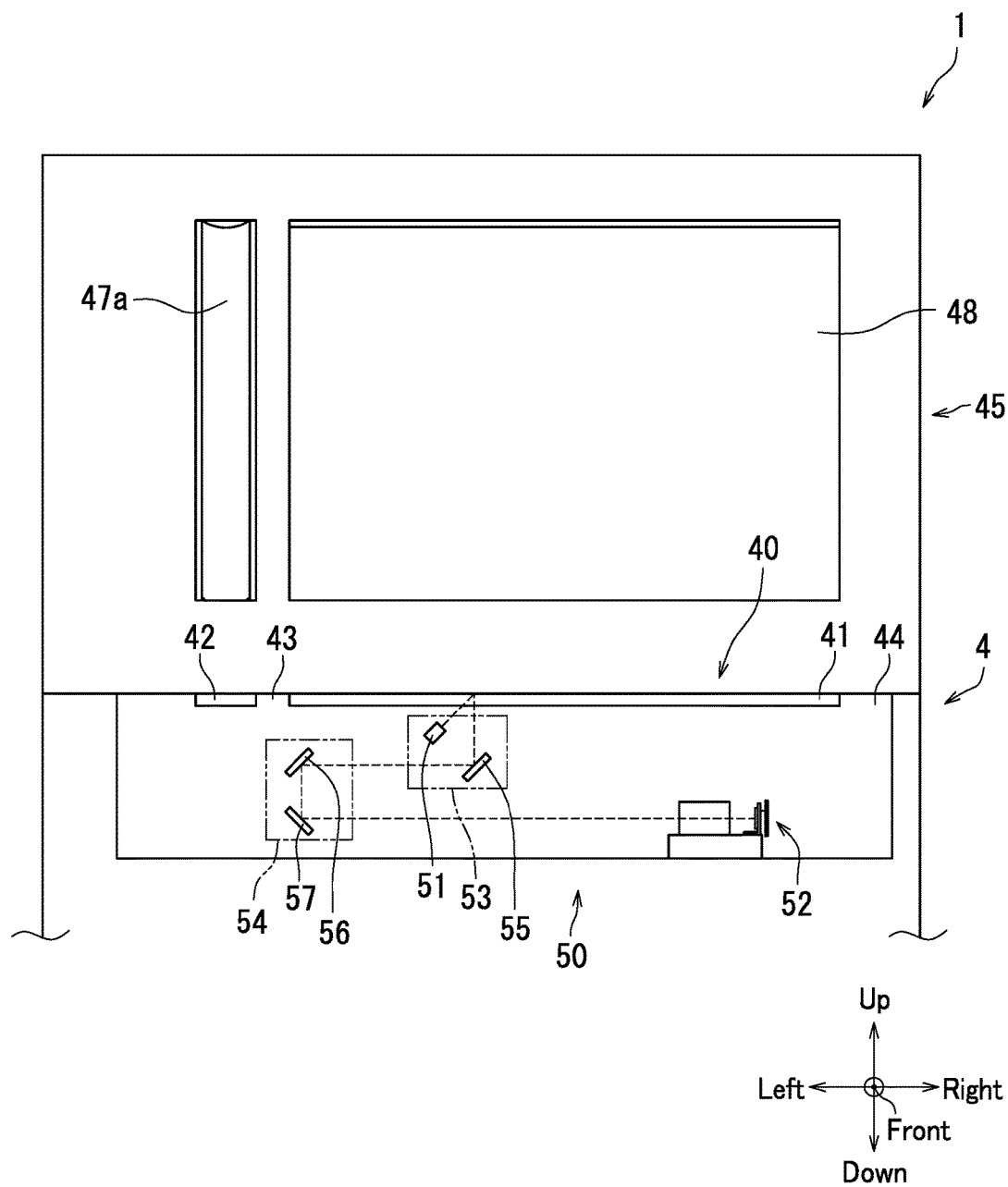
FIG. 6 is a cross-sectional view schematically illustrating the image reading device illustrated in FIG. 2.

The following further describes the configuration of the image reading device 4 with reference to FIG. 6. FIG. 6 is a cross-sectional view schematically illustrating the image reading device 4. As illustrated in FIG. 6, the image reading device 4 further includes a reader 50.

The reader 50 reads the document P1 or P2 and the identification medium D1 or D2 to generate image data. The reader 50 includes a light source 51, a light receiver 52, a first moving section 53, a second moving section 54, first mirror 55, second mirror 56, and third mirror 57.

The reader 50 moves the light source 51, the first mirror 55, the second mirror 56, and the third mirror 57 in the left-right direction using the first moving section 53 and the second moving section 54 to read images of the document P1 or P2 and the identification medium D1 or D2.

For reading an image of the document P2 or the identification medium D1 loaded on the first contact glass 41, the light source 51 is moved rightward from a standby position. The standby position is located under the partition 43. For reading an image of the identification medium D2 loaded on the second contact glass 42 or an image of the document P1 conveyed by the conveyance section 47, the light source 51 is moved leftward from the standby position.

The reader 50 emits light from the light source 51 for reading an image. The light emitted from the light source 51 is reflected off the document P1 or P2, or the identification medium D1 or D2. The light reflected off the document P1 or P2, or the identification medium D1 or D2 is received by the light receiver 52 via the first mirror 55, the second mirror 56, and the third mirror 57. As a result, the light receiver 52 captures the image of the document P1 or P2, or the identification medium D1 or D2. The reader 50 generates image data based on the image captured. The image data is output to the controller 7.

Figure 7:
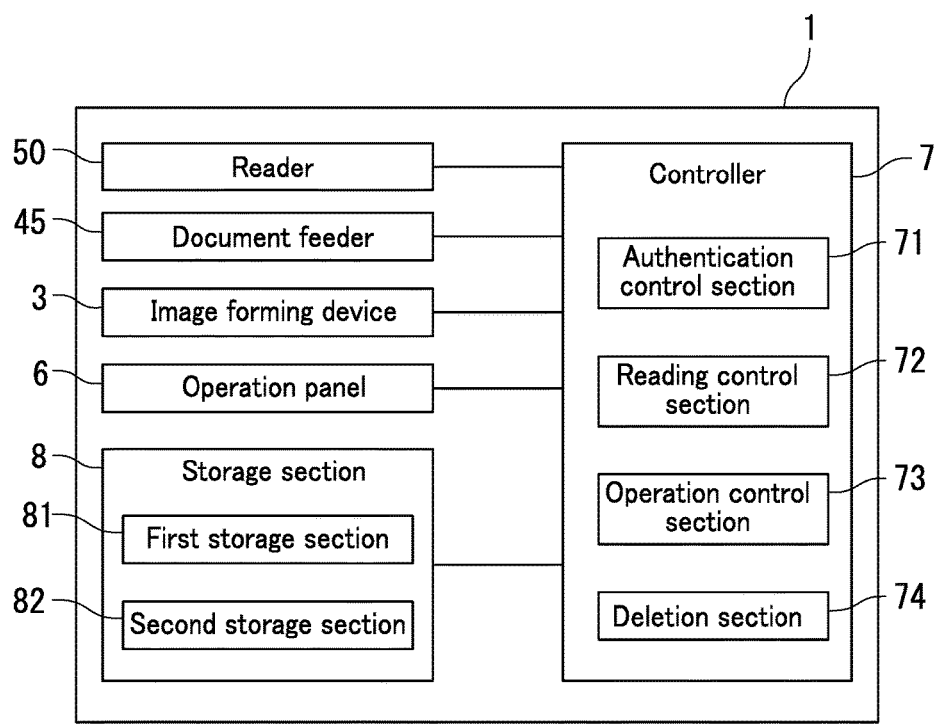
FIG. 7 is a block diagram illustrating the configuration of the image forming apparatus illustrated in FIG. 1.

The following describes the controller 7 and the storage section 8 with reference to FIGS. 1 and 7. FIG. 7 is a block diagram illustrating the configuration of the image forming apparatus 1. As illustrated in FIG. 7, the storage section 8 includes a first storage section 81 and a second storage section 82. The first storage section 81 includes semiconductor memory such as read only memory (ROM) and random access memory (RAM). Various control programs that are executed by the controller 7 are for example stored in the ROM. The image data of the document P1 or P2 and the image data of the identification medium D1 or D2 output to the controller 7 is for example stored in the RAM. The second storage section 82 for example has a hard disk drive. Preliminarily input personal data is stored in the second storage section 82.

The controller 7 implements an authentication control section 71, a reading control section 72, an operation control section 73, and a deletion section 74 through execution of the control programs prestored in the storage section 8. The controller 7 for example includes a processor such as a central processing unit (CPU).

The reading control section 72 controls the reader 50. The reading control section 72 for example controls the reader 50 to start reading the document P1 or P2 and the identification medium D1 or D2 upon input of a start signal of the copy function.

The reading control section 72 controls reading of the document P1 or P2 and the identification medium D1 or D2 based on the document detection signal from the document feeder 45. More specifically, in a situation in which no document detection signal is output from the document feeder 45 to the controller 7, the reading control section 72 controls the reader 50 to move the light source 51 leftward from the standby position. As a result, the reader 50 reads the image of the identification medium D2 loaded on the second contact glass 42 to generate image data of the identification medium D2. After the reader 50 has read the image of the identification medium D2, the reading controller 72 controls the reader 50 to move the light source 51 rightward. As a result, the reader 50 reads the image of the document P2 to generate image data of the document P2. The reading control section 72 stores the image data of the document P2 and the image data of the identification medium D2 in the RAM of the first storage section 81.

In a situation in which a document detection signal is output from the document feeder 45 to the controller 7, the reading control section 72 controls the reader 50 to move the light source 51 rightward from the standby position. As a result, the reader 50 reads the image of the identification medium D1 loaded on the first contact glass 41 to generate image data of the identification medium D1. After the reader 50 has read the image of the identification medium D1, the reading control section 72 controls the reader 50 to move the light source 51 leftward beyond the standby position and stop the light source 51 under the second contact glass 42. Subsequently, the reading control section 72 controls the document feeder 45 to successively convey a plurality of sheets of the document P1 loaded on the document feed tray 46. As a consequence, the reader 50 successively reads images of the sheets of the document P1 to generate image data of the document P1. The reading control section 72 stores the image data of the document P1 and the image data of the identification medium D1 in the RAM of the first storage section 81.

The authentication control section 71 starts authentication of a user of the image forming apparatus 1 upon the image data of the identification medium D1 or D2 being stored in the first storage section 81. The authentication control section 71 performs authentication of the user based on the image data of the identification medium D1 or D2 stored in the first storage section 81 and the personal data stored in the second storage section 82. More specifically, the authentication control section 71 for example uses a character recognition function to recognize an employee number from the image data of the identification medium D1 or D2.

When the authentication control section 71 fails to recognize an employee number from the image data of the identification medium D1 or D2, the authentication control section 71 rotates the image of the identification medium D1 or D2 based on the image data and recognizes an employee number included in the image of the identification medium D1 or D2. More specifically, the authentication control section 71 rotates the image data of the identification medium D1 or D2 by for example 90° or 180° such that the up-down direction of characters therein becomes appropriate. Thereafter, the authentication control section 71 uses the character recognition function again to recognize an employee number from the image data of the identification medium D1 or D2. Thus, the authentication control section 71 can recognize the image data of the identification medium D1 or D2 regardless of the orientation of the loaded identification medium D1 or D2.

The authentication control section 71 compares the recognized employee number against a plurality of employee numbers preliminarily input as the personal data. If the recognized employee number matches any one of the plurality of employee numbers, the authentication control section 71 generates authentication information indicating successful authentication. The term "successful authentication" means that the authentication of the user has been successful. If the recognized employee number does not match any of the plurality of employee numbers, the authentication control section 71 generates authentication information indicating unsuccessful authentication. The term "unsuccessful authentication" means that the authentication of the user has failed.

If the authentication information indicates successful authentication, the operation control section 73 controls the image forming device 3 to form an image on the sheet S based on the image data of the document P1 or P2 stored in the first storage section 81. If the authentication information indicates unsuccessful authentication, the operation control section 73 keeps the image forming device 3 from operating. That is, the image forming apparatus 1 according to the present embodiment does not form an image based on the image data of the document P1 or P2 stored in the first storage section 81 if the authentication information indicates unsuccessful authentication. The operation control section 73 may control the operation panel 6 to display an image indicating unsuccessful authentication if the authentication information indicates unsuccessful authentication.

The deletion section 74 deletes the image data of the document P1 or P2 and the image data of the identification medium D1 or D2 from the first storage section 81. If no document detection signal is input and the authentication information indicates unsuccessful authentication, the deletion section 74 deletes the image data of the document P2 and the image data of the identification medium D2 from the first storage section 81. If the document detection signal is input and authentication information indicating unsuccessful authentication is input more than a predetermined times, the deletion section 74 deletes the image data of the document P1 and the image data of the identification medium D1 from the first storage section 81.

Through the above, the image reading device 4 and the image forming apparatus 1 according to an embodiment of the present disclosure have been described with reference to FIGS. 1 to 7. However, the present disclosure is not limited to the above-described embodiment and can be practiced in various ways within the scope without departing from the essence of the present disclosure.

For example, according to the above-described embodiment of the present disclosure, the cursors 46a and 46b restrict the position of the document P1 loaded on the document feed tray 46 such that the centerline PL of the document P1 coincides with the centerline L of the document feed tray 46. However, the present disclosure is not limited to such an embodiment. It is only necessary that the cursors 46a and 46b restrict the position of the document P1 on the document feed tray 46. The cursors 46a and 46b may restrict the position of the document P1 such that the document P1 abuts one end of the document feed tray 46.

Figure 8:
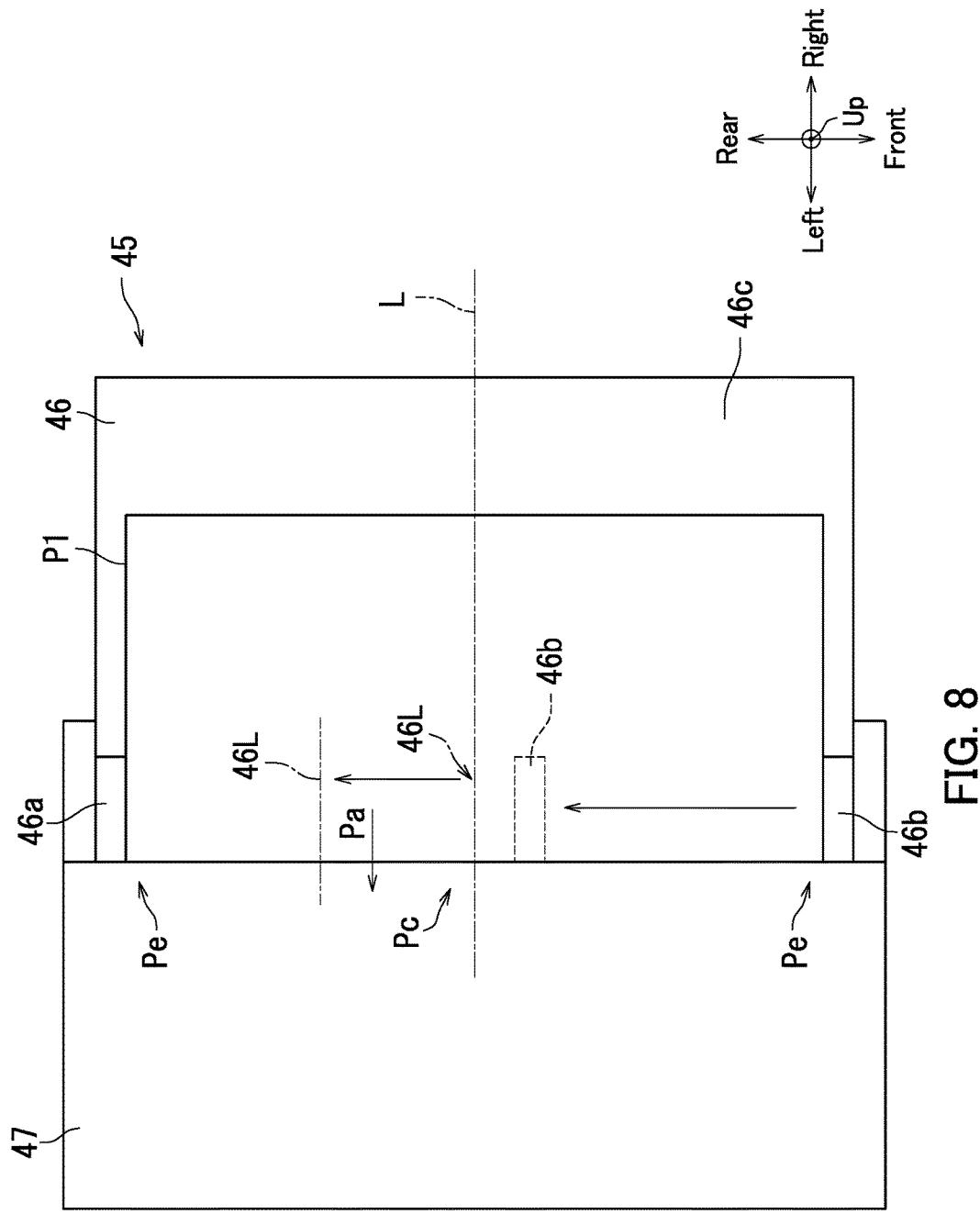
FIG. 8 is a plan view schematically illustrating a document feeder according to another embodiment of the present disclosure.

The following describes the cursors 46a and 46b according to a different embodiment with reference to FIGS. 4 and 8. FIG. 8 is a plan view schematically illustrating the document feeder 45 according to the different embodiment. As illustrated in FIG. 8, the cursor 46a is fixed at a rear end of the document feed tray 46. The cursor 46a is an example of what may be referred to as a first cursor according to the present disclosure. The cursor 46b is fixable to any position on the top surface 46c in the front-rear direction. That is, the cursor 46b is disposed on the top surface 46c so as to be slidable in the front-back direction. The cursor 46b is an example of what may be referred to as a second cursor according to the present disclosure. Thus, the document P1 loaded on the document feed tray 46 is restricted by the cursor 46b to a position where the document P1 abuts the cursor 46a.

According to the embodiment illustrated in FIG. 8, the medium restriction section 59, which is described with reference to FIG. 4, is located in a rear portion of the loading section 40 rather than in a front portion of the loading section 40. The medium restriction section 59 is spaced from the rear end of the loading section 40 by a specific distance. For example, a centerline 46L of a space between the cursor 46a and the cursor 46b overlaps the medium restriction section 59 in a plan view of the document feeder 45 conveying the document P1 from the document feed tray 46 toward the top surface of the second contact glass 42. The centerline 46L extends in parallel to the conveyance direction Pa of the document P1. As a result, the end portions of the document P1 being conveyed is prevented from coming in contact with the medium restriction section 59, allowing smooth conveyance of the document P1.

For another example, according to the above-described embodiment of the present disclosure, the personal data is stored in the second storage section 82. However, the present disclosure is not limited to such an embodiment. According to another embodiment, for example, the personal data may be received for authentication from a server device external to the image forming apparatus 1.

For another example, according to the above-described embodiment of the present disclosure, an entirety of the identification medium D1 or D2 is read to generate the image data of the identification medium. However, the present disclosure is not limited to such an embodiment. According to another embodiment of the present disclosure, a portion of the identification medium D1 or D2 may be read to generate the image data of the identification medium D1 or D2. According to such an embodiment, the reader 50 reads a portion of the employee number or the personal data such as a facial picture printed on the identification medium D1 or D2. More specifically, the identification medium D1 or D2 is loaded at the first loading position or the second loading position, so that a portion of the personal data printed on the identification medium D1 or D2 is located within a predetermined range. The reader 50 only reads the predetermined range. As a result, the portion of the personal data is read. According to such an embodiment, the size of the image data of the identification medium D1 or D2 can be reduced, and the time needed to read the identification medium D1 or D2 can be shortened.

The drawings schematically illustrate elements of configuration in order to facilitate understanding and properties of elements of configuration illustrated in the drawings, such as thickness and length thereof, may differ from actual properties thereof in order to facilitate preparation of the drawings. Furthermore, properties of elements of configuration described in the above embodiments, such as shapes, are merely examples and are not intended as specific limitations. Various alterations may be made so long as there is no substantial deviation from the effects of the present disclosure.

What is claimed is:

1. An image reading device comprising:
 a loading section configured to receive loading of a document and an identification medium;
 a reader configured to read the document and the identification medium; and
 a document feeder configured to convey the document to the reader, wherein
 the loading section includes:
  a first loading section configured to receive loading of the identification medium; and
  a medium restriction section configured to restrict a position of the identification medium loaded on the first loading section,
 the first loading section is plate-shaped contact glass facing a bottom surface of the document feeder,
 the medium restriction section is disposed adjacent to the first loading section and faces the bottom surface of the document feeder,
 the document being conveyed by the document feeder has opposite end portions and a central portion between the opposite end portions, the opposite end portions respectively including opposite ends of the document in a direction perpendicular to a conveyance direction of the document, and
 only the central portion, among the opposite end portions and the central portion, of the document conveyed to the reader by the document feeder comes in contact with the medium restriction section.

2. The image reading device according to claim 1, wherein
 the document feeder includes a feed tray configured to receive loading of the document, and
 the medium restriction section is located in the loading section at a position corresponding to a position of the document on the feed tray.

3. The image reading device according to claim 2, wherein
 the feed tray has a document restriction section configured to restrict the position of the document loaded on the feed tray, and the document restriction section restricts the position of the document such that a centerline of the document extending in parallel to the conveyance direction of the document coincides with a centerline of the feed tray extending in parallel to the conveyance direction of the document.

4. The image reading device according to claim 3, wherein
the centerline of the feed tray and the centerline of the document overlap the medium restriction section in a plan view of the document feeder conveying the document from the feed tray toward the first loading section.

5. The image reading device according to claim 2, wherein
the feed tray has a document restriction section configured to restrict the position of the document loaded on the feed tray,
the document restriction section includes:
a first cursor fixed at one end of the feed tray in the direction perpendicular to the conveyance direction of the document; and
a second cursor slidable in the direction perpendicular to the conveyance direction of the document, and
the second cursor restricts the position of the document such that the document abuts the first cursor.

6. The image reading device according to claim 5, wherein
the first cursor and the second cursor has a space therebetween, and a centerline of the space extending in parallel to the conveyance direction of the document overlaps the medium restriction section in a plan view of the document feeder conveying the document from the feed tray toward the first loading section.

7. The image reading device according to claim 1, wherein
the loading section further includes:
a second loading section configured to receive loading of the document or the identification medium; and
a partition located between the first loading section and the second loading section,
the medium restriction section includes a cutaway section formed in the partition, and
the cutaway section comes in contact with an edge of the identification medium loaded on the first loading section.

8. The image reading device according to claim 1, further comprising:
an authentication control section configured to perform authentication of a user based on image data of the identification medium representing an image of the identification medium to generate authentication information indicating a result of the authentication of the user; and
a reading control section configured to control the reader, wherein
the reading control section controls the reader to generate the image data of the identification medium and thereafter read the document.

9. The image reading device according to claim 8, wherein
the authentication control section rotates the image of the identification medium based on the image data of the identification medium and recognizes a character included in the image of the identification medium.

10. The image reading device according to claim 1, wherein
the reader reads a portion of the identification medium to generate image data of the identification medium.

11. An image forming apparatus comprising:
the image reading device according to claim 1; and
an image forming device configured to form an image on a recording medium.

12. The image reading device according to claim 1, wherein
the medium restriction section has a cutaway section and a contact section located opposite to the cutaway section, the cutaway section having a shape according to a shape of the identification medium,
the cutaway section comes in contact with an edge of the identification medium loaded on the first loading section,
the contact section comes in contact with another edge of the identification medium, and
the cutaway section and the contact section restrict the identification medium loaded on the first loading section from moving.

* * * * *